US012056039B2

(12) United States Patent
Govindaraju et al.

(10) Patent No.: US 12,056,039 B2
(45) Date of Patent: Aug. 6, 2024

(54) RELATED METRICS-BASED MONITORING OF COMPUTING-INSTANCES

(71) Applicant: VMware LLC, Palo Alto, CA (US)

(72) Inventors: Agila Govindaraju, Bangalore (IN);
Rutuja Dhamale, Bangalore (IN);
Charitha Gurram, Bangalore (IN);
Ramya Bangera, Bangalore (IN);
Auroprava Rout, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/561,767

(22) Filed: Dec. 24, 2021

(65) Prior Publication Data

US 2023/0205666 A1 Jun. 29, 2023

(51) Int. Cl.
G06F 11/34 (2006.01)
G06F 9/451 (2018.01)
G06F 9/455 (2018.01)
G06F 9/54 (2006.01)
G06N 5/02 (2023.01)
G06N 20/00 (2019.01)

(52) U.S. Cl.
CPC .......... *G06F 11/3495* (2013.01); *G06F 9/451* (2018.02); *G06F 9/45558* (2013.01); *G06F 9/542* (2013.01); *G06N 5/02* (2013.01); *G06N 20/00* (2019.01); *G06F 2009/45591* (2013.01)

(58) Field of Classification Search
CPC .. G06F 11/3495; G06F 9/451; G06F 9/45558; G06F 9/542; G06F 2009/45591; G06N 5/02; G06N 20/00
See application file for complete search history.

(56) References Cited

U.S. PATENT DOCUMENTS

| | | | |
|---|---|---|---|
| 2003/0110007 A1* | 6/2003 | McGee | G06F 17/15 702/179 |
| 2015/0379426 A1* | 12/2015 | Steele | G06N 5/025 706/12 |
| 2017/0206594 A1* | 7/2017 | Stausholm | G06Q 30/0641 |
| 2018/0270126 A1* | 9/2018 | Tapia | H04L 41/5067 |
| 2019/0171438 A1* | 6/2019 | Franchitti | G06N 3/08 |
| 2019/0228343 A1* | 7/2019 | Gu | G06N 20/00 |
| 2019/0286504 A1* | 9/2019 | Muntés-Mulero | G06F 11/0709 |
| 2019/0391897 A1* | 12/2019 | Vijendra | G06N 20/00 |
| 2021/0194924 A1* | 6/2021 | Heinemeyer | G06F 21/577 |

(Continued)

*Primary Examiner* — Tuan C Dao
(74) *Attorney, Agent, or Firm* — Quarles & Brady LLP

(57) ABSTRACT

In one example, a computing node includes a metric dependency graph knowledge base to store a data structure representing a relationship between a plurality of metrics. Further, the computing node may include a processor and a memory having a metric recommendation unit. The metric recommendation unit may determine a first metric of a monitored computing-instance while a user interacts with a GUI of a monitoring application. Further, the metric recommendation unit may retrieve the data structure corresponding to the first metric. The data structure may include the first metric and a plurality of dependent metrics associated with the first metric. Further, the metric recommendation unit may apply a machine learning model on the data structure to determine a second metric from the plurality of dependent metrics. Furthermore, the metric recommendation unit may output the second metric related to the first metric on the GUI.

20 Claims, 7 Drawing Sheets

(56) References Cited

U.S. PATENT DOCUMENTS

2021/0224858 A1* 7/2021 Khoury .............. G06Q 30/0276
2021/0273958 A1* 9/2021 McLean .............. H04L 63/1433
2022/0129804 A1* 4/2022 Dooley .............. G06Q 10/0635

* cited by examiner

```
{
    "name": "CPU capacity demand",
    "description": "The amount of CPU resources a virtual machine would use if there were no CPU contention or CPU limit.",
    "metric": "cpu.capacity.demand"
},
{
    "name": "CPU capacity provisioned",
    "description": "Capacity in MHz of the physical CPU cores.",
    "metric": "cpu.capacity.provisioned",
    "parents": [
        "cpu.capacity.demand"
    ]
},
{
    "name": "CPU capacity usage",
    "description": "CPU usage as a percent during the interval.",
    "metric": "cpu.capacity.usage",
    "parents": [
        "cpu.capacity.demand",
        "cpu.capacity.provisioned"
    ]
},
{
    "name": "CPU core utilization",
    "description": "CPU utilization of the corresponding core (if hyper-threading is enabled) as a percentage during the interval (A core is utilized if either or both of its logical CPUs are utilized).",
    "metric": "cpu.core.utilization",
    "parents": [
        "cpu.capacity.demand"
    ]
}
```

- 302: CPU capacity demand
- 304: CPU capacity provisioned
- 306: CPU capacity usage
- 308: CPU core utilization

```
public class Metric {
    //Name of the metric.              ← 352
    private String name;

// Brief description of the metric.    ← 354
    private String description;

// Metric name used to identify this metric uniquely.   ← 356
    private String metric;

// List of Metric instances that are related to this metric   ← 358
    private List<Metric> children;

}
```

RELATED METRICS-BASED MONITORING OF COMPUTING-INSTANCES

TECHNICAL FIELD

The present disclosure relates to computing environments, and more particularly to methods, techniques, and systems for monitoring health of computing-instances based on determining related metrics for a given metric.

BACKGROUND

In application/operating system (OS) monitoring environments, a management node may communicate with multiple computing-instances (i.e., endpoints) to monitor the endpoints. For example, an endpoint is implemented in a physical computing environment, a virtual computing environment, or a cloud computing environment. Further, the endpoints may execute different applications via virtual machines (VMs), physical computing devices, containers, and the like. In such environments, the management node may communicate with the endpoints to collect performance data/metrics (e.g., application metrics, OS metrics, and the like) from underlying OS and/or services on the endpoints for storage and performance analysis (e.g., to detect and diagnose issues).

BRIEF DESCRIPTION OF THE DRAWINGS

FIG. 3A depicts an example data structure in a JSON format;

Figure 1A:
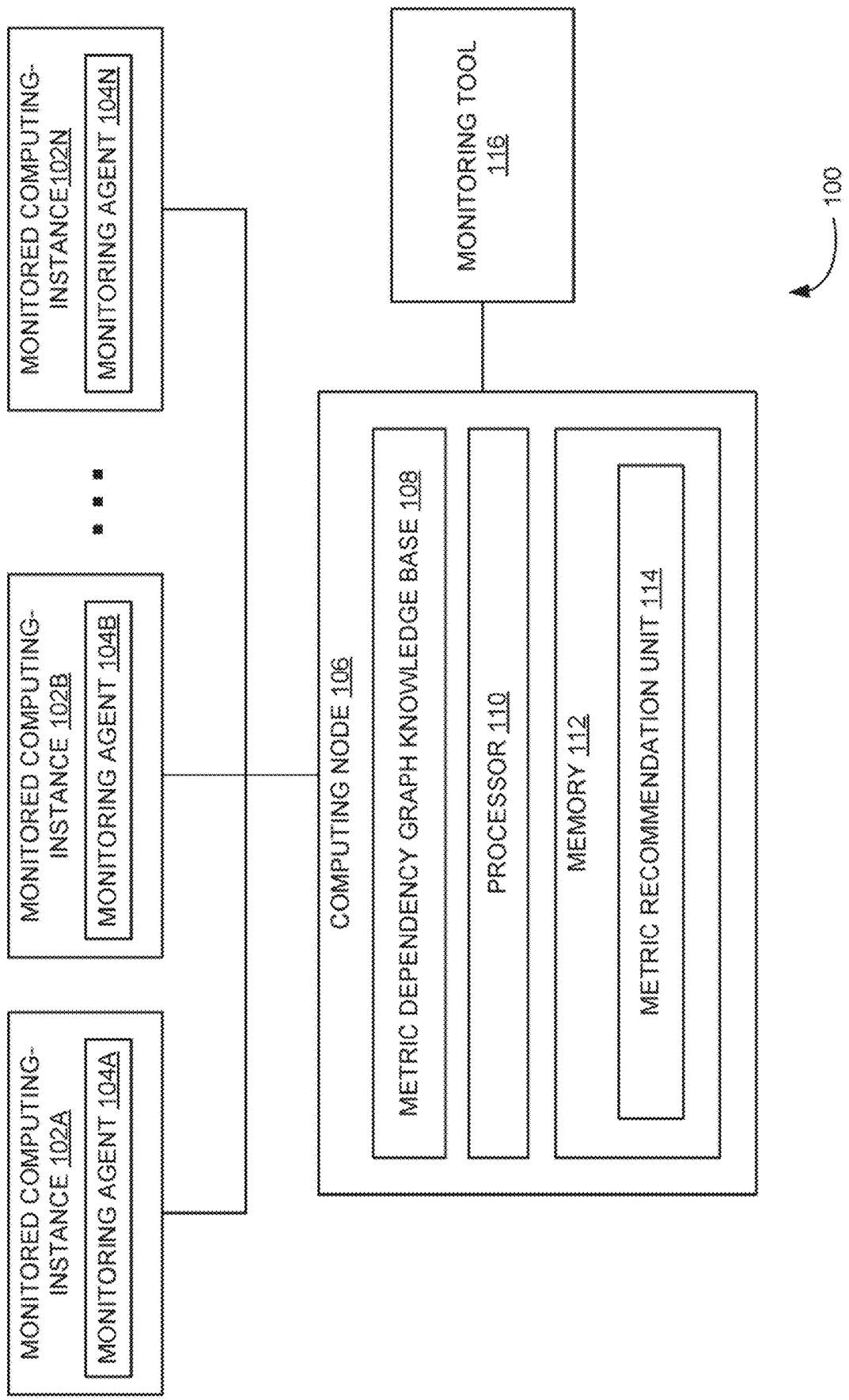
FIG. 1A is a block diagram of an example system, depicting a computing node to determine related metrics of a metric to monitor a health of a computing instance.

The drawings described herein are for illustration purposes and are not intended to limit the scope of the present subject matter in any way.

DETAILED DESCRIPTION

Examples described herein may provide an enhanced computer-based and/or network-based method, technique, and system to determine related metrics of a given metric to monitor a health of a computing-instance in a computing environment. Computing environment may be a physical computing environment (e.g., an on-premises enterprise computing environment or a physical data center) and/or virtual computing environment (e.g., a cloud computing environment, a virtualized environment, and the like).

The virtual computing environment may be a pool or collection of cloud infrastructure resources designed for enterprise needs. The resources may be a processor (e.g., central processing unit (CPU)), memory (e.g., random-access memory (RAM)), storage (e.g., disk space), and networking (e.g., bandwidth). Further, the virtual computing environment may be a virtual representation of the physical data center, complete with servers, storage clusters, and networking components, all of which may reside in virtual space being hosted by one or more physical data centers. The virtual computing environment may include multiple physical computers executing different computing-instances or endpoints (e.g., physical computers, virtual machines, and/or containers). The computing-instances may execute several types of applications.

Further, performance monitoring of such computing-instances has become increasingly important because performance monitoring may aid in troubleshooting (e.g., to rectify abnormalities or shortcomings, if any) the computing-instances, provide better health of data centers, analyse the cost, capacity, and/or the like. An example performance monitoring tool or application or platform is VMware® vRealize Operations (vROps), Vmware Wavefront™, Grafana, and the like.

Such performance monitoring tools may include agent-based approach or agentless approach. Agent based performance monitoring may involve an agent to be installed into the computing-instances or endpoints for monitoring whereas agentless does not involve any agent to be installed in the computing-instances or endpoints for monitoring. In an example agent-based approach, the computing-instances include monitoring agents (e.g., Telegraf™, collectd, Micrometer, and the like) to collect the performance metrics from the respective computing-instances and provide, via a network, the collected performance metrics to a remote collector. Furthermore, the remote collector may receive the performance metrics from the monitoring agents and transmit the performance metrics to the monitoring tool for metric analysis. The remote collector may refer to an additional cluster node that allows the monitoring tool (e.g., vROps Manager) to gather objects into the remote collector's inventory for monitoring purposes. The remote collectors collect the data from the computing-instances and then forward the data to a management node that executes the monitoring tool. For example, remote collectors are deployed at remote location sites while the monitoring tool may be deployed at a primary location.

In both the agent-based approach and the agentless approach, the monitoring tool may receive the performance metrics, analyse the received performance metrics, and display the analysis in a form of dashboards, for instance. The displayed analysis may facilitate in visualizing the performance metrics and diagnose a root cause of issues, if any. In some examples, the monitoring tools may house several thousands of metrics collected by the application remote collector. The number of metrics increases with an increase in the number of computing-instances. In such scenarios, for a user or analyser to understand the metrics, a dashboard with various charts may be created. With various metrics and associated charts, navigating through the metrics to understand the health of a particular computing-instance may become complex and time consuming. For example, when a user logs in for the first time, the user may be confused as which of these metrics are related to each other and how to navigate through the related metrics to understand the health of a particular application.

Examples described herein may provide a computing node including a metric dependency graph knowledge base to store a data structure representing a relationship between a plurality of metrics. Further, the computing node may include a processor and a memory including a metric recommendation unit. The metric recommendation unit may determine a first metric of a monitored computing-instance while a user interacts with a graphical user interface (GUI) of a monitoring application. Further, the metric recommendation unit may retrieve the data structure corresponding to the first metric from the metric dependency graph knowledge base. The data structure may include the first metric and a plurality of dependent metrics associated with the first metric. Furthermore, the metric recommendation unit may apply a machine learning model on the data structure to determine a second metric from the plurality of dependent metrics. The machine learning model may be trained to determine the second metric related to the first metric based on navigation pattern data of users interacting with the GUI. Further, the metric recommendation unit may output the second metric related to the first metric on the GUI. Furthermore, the metric recommendation unit may enable the user to navigate through the second metric to identify a root cause of an issue associated with the monitored computing-instance.

Thus, examples described herein may provide a methodology to present recommendations (i.e., related metrics) for a given metric so that, users can navigate through the hierarchy of the related metrics to root cause an issue/create necessary charts to form a dashboard and thereby understand the health of the monitored computing-instance. Further, examples described herein may recommend the related metrics, which may bring in business use cases perspective to the existing monitoring tools and thus helps the users to monitor the computing-instance health effectively.

In the following description, for purposes of explanation, numerous specific details are set forth to provide a thorough understanding of the present techniques. It will be apparent, however, to one skilled in the art that the present apparatus, devices, and systems may be practiced without these specific details. Reference in the specification to "an example" or similar language means that a particular feature, structure, or characteristic described is included in at least that one example, but not necessarily in other examples.

System Overview and Examples of Operation

FIG. 1A is a block diagram of an example system 100, depicting a computing node 106 to determine related metrics of a given metric to monitor a health of a computing instance (e.g., 102A). Example system 100 includes a computing environment such as a cloud computing environment (e.g., a virtualized cloud computing environment). For example, the cloud computing environment is VMware vSphere®. The cloud computing environment may include one or more computing platforms that support the creation, deployment, and management of virtual machine-based cloud applications. An application, also referred to as an application program, may be a computer software package that performs a specific function directly for an end user or, in some cases, for another application. Examples of applications include MySQL, Tomcat, Apache, word processors, database programs, web browsers, development tools, image editors, communication platforms, and the like.

Example system 100 includes monitored computing-instances 102A-102N, a monitoring tool or monitoring application 116, and a computing node 106 to process the metrics (e.g., performance metrics) of monitored computing-instances 102A-102N and display the metrics using monitoring application 116 (e.g., Wavefront, Grafana, New Relic, or the like) for metric analysis. Example monitored computing-instances 102A-102N include, but not limited to, virtual machines, physical host computing systems, containers, software defined data centers (SDDCs), and/or the like. For example, monitored computing-instances 102A-102N can be deployed either in an on-premises platform or an off-premises platform (e.g., a cloud managed SDDC). Further, the SDDC may include various components such as a host computing system, a virtual machine, a container, or any combinations thereof. Example host computing system is a physical computer. The physical computer may be a hardware-based device (e.g., a personal computer, a laptop, or the like) including an operating system (OS). The virtual machine may operate with its own guest OS on the physical computer using resources of the physical computer virtualized by virtualization software (e.g., a hypervisor, a virtual machine monitor, and the like). The container may be a data computer node that runs on top of host operating system without the need for the hypervisor or separate operating system.

Further, monitored computing-instances 102A-102N includes corresponding monitoring agents 104A-104N to monitor respective computing-instances 102A-102N. In an example, monitoring agent 104A deployed in monitored computing-instance 102A fetches the metrics from various components of monitored computing-instance 102A. For example, monitoring agent 104A real-time monitors computing-instance 102A to collect metrics (e.g., telemetry data) associated with an application or an operating system running in monitored computing-instance 102A. Example monitoring agents 104A-104N include Telegraf agents, Collectd agents, or the like. Metrics may include performance metric values associated with at least one of central processing unit (CPU), memory, storage, graphics, network traffic, or the like. In some examples, system 100 includes a remote collector, which may be an additional cluster node that gather the metrics from computing-instances 102A-102N. Further, the remote collector may provide the gathered metrics to monitoring application 116 for monitoring purposes via computing node 106. In other examples, monitoring application 116 may be agentless, where monitoring application 116 collects performance metrics from devices without needing to install a monitoring agent on computing-instances 102A-102N being monitored.

In an example, computing node 106 can be a physical computing device, a virtual machine, a container, or the like. Computing node 106 receives the metrics from the remote collector via a network and determine related metrics to be displayed via monitoring application 116. In an example, computing node 106 is connected external to monitoring application 116 via the network as shown in FIG. 1A. In another example, monitoring application 116 is executed in computing node 106. An example network can be a managed Internet protocol (IP) network administered by a service provider. For example, the network is implemented using wireless protocols and technologies, such as WiFi, WiMax, and the like. In other examples, the network can also be a packet-switched network such as a local area network, wide area network, metropolitan area network, Internet network, or other similar type of network environment. In yet other examples, the network is a fixed wireless network, a wireless local area network (LAN), a wireless wide area network (WAN), a personal area network (PAN), a virtual private network (VPN), intranet or other suitable network system and includes equipment for receiving and transmitting signals.

As shown in FIG. 1A, computing node 106 includes a metric dependency graph knowledge base 108 to store a data structure representing a relationship between a plurality of metrics. In an example, the data structure includes multiple metric dependency levels of the metrics. The data structure may be formatted in accordance with one or more of JavaScript object notation (JSON), extensible markup language (XML), a binary file, a database file, YAML ain't markup language (YAML), and/or a proprietary encoding scheme. An example data structure in JSON format is depicted in FIG. 3A.

Further, computing node 106 includes a processor 110 and a memory 112 coupled to processor 110. Furthermore, memory 112 includes a metric recommendation unit 114. The term "processor" may refer to, for example, a central processing unit (CPU), a semiconductor-based microprocessor, a digital signal processor (DSP) such as a digital image processing unit, or other hardware devices or processing elements suitable to retrieve and execute instructions stored in a storage medium, or suitable combinations thereof. Processor 110 may, for example, include single or multiple cores on a chip, multiple cores across multiple chips, multiple cores across multiple devices, or suitable combinations thereof. Processor 110 may be functional to fetch, decode, and execute instructions as described herein.

Figure 2:
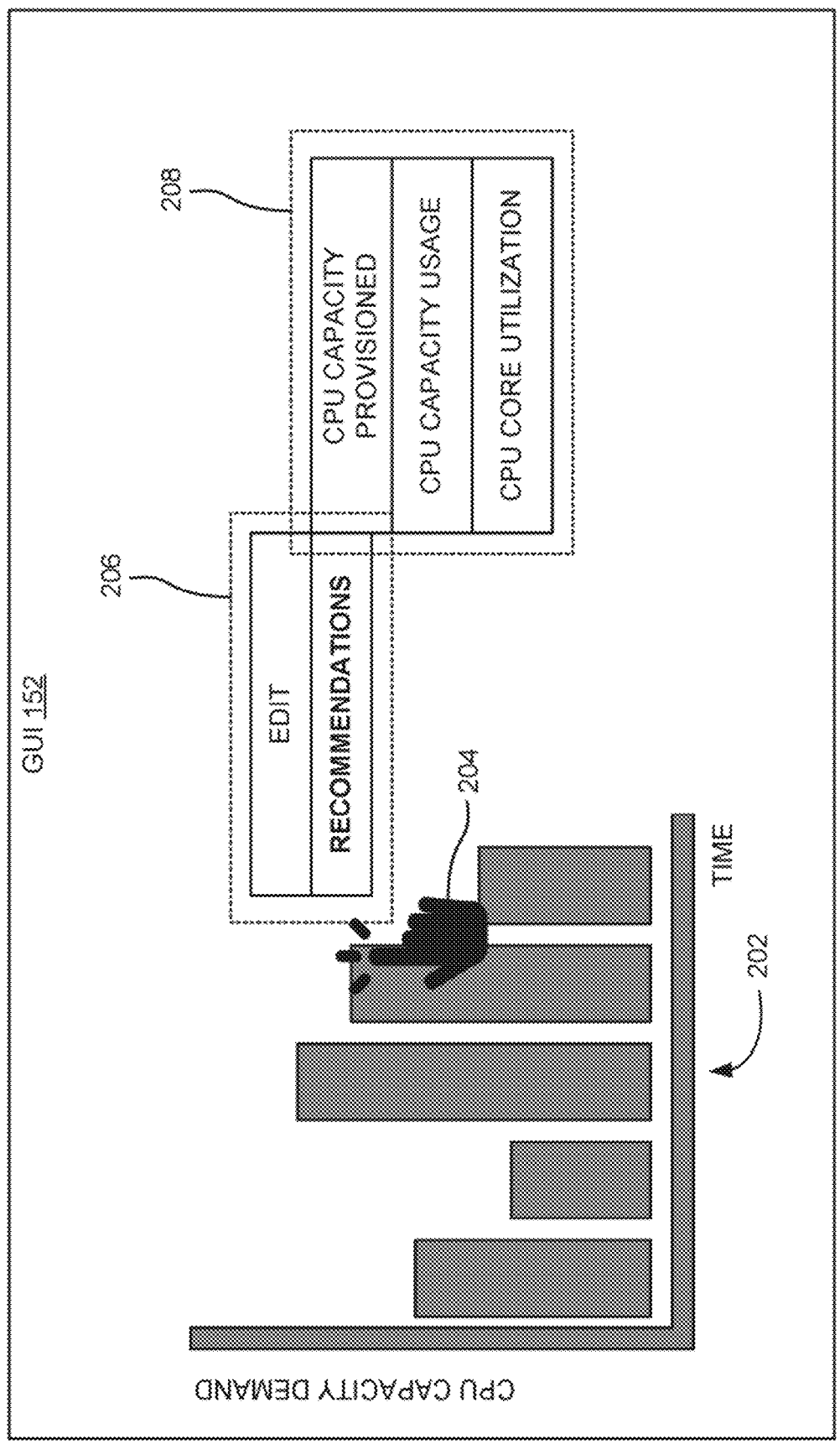
FIG. 2 shows an example graphical user interface (GUI) of FIG. 1B, depicting related metrics of a user selected metric.

During operation, metric recommendation unit 114 may determine a first metric of a monitored computing-instance while a user interacts with a graphical user interface (GUI) of a monitoring application. An example GUI depicting user interaction is shown in FIG. 2. Further, metric recommendation unit 114 may retrieve the data structure corresponding to the first metric from metric dependency graph knowledge base 108. In an example, the data structure includes the first metric and a plurality of dependent metrics associated with the first metric.

Further, metric recommendation unit 114 may apply a machine learning model on the data structure to determine a second metric from the plurality of dependent metrics. In an example, the machine learning model is trained to determine the second metric related to the first metric based on navigation pattern data of users interacting with the GUI. The navigation pattern data may include time series data captured while the users navigate through the plurality of metrics in the GUI associated with the monitoring application. An example training of the machine learning model is described in FIGS. 2 and 4.

Furthermore, metric recommendation unit 114 may output the second metric related to the first metric on the GUI. In an example, metric recommendation unit 114 may output the second metric by generating a dashboard including a chart on the GUI. The chart may represent the second metric in the form of a line graph, a gauge, a bar graph, a progress bar, a color-coded alert, or the like. Further, metric recommendation unit 114 may enable the user to navigate through the second metric to identify a root cause of an issue associated with the monitored computing-instance.

Further, metric recommendation unit 114 may apply the machine learning model on the data structure to determine a third metric related to the second metric from the plurality of dependent metrics in response to a user selection of the second metric on the GUI. Further, metric recommendation unit 114 may output the third metric related to the second metric on the GUI. Thus, examples described herein may recommend dependent metrics related to a particular metric that the user is currently looking at to facilitate the user to navigate through the related metrics to narrow down an issue when the health of a computing-instance deteriorates.

In some examples, the functionalities described in FIG. 1A, in relation to instructions to implement functions of monitoring agents 104A-104B, metric recommendation unit 114, and any additional instructions described herein in relation to the storage medium, may be implemented as engines or modules including any combination of hardware and programming to implement the functionalities of the modules or engines described herein. The functions of monitoring agents 104A-104B and metric recommendation unit 114 may also be implemented by a respective processor. In examples described herein, the processor may include, for example, one processor or multiple processors included in a single device or distributed across multiple devices. In some examples, functionalities of computing node 106 and monitoring application 116 can be a part of management software (e.g., vROps and Wavefront that are offered by VMware®).

Figure 1B:
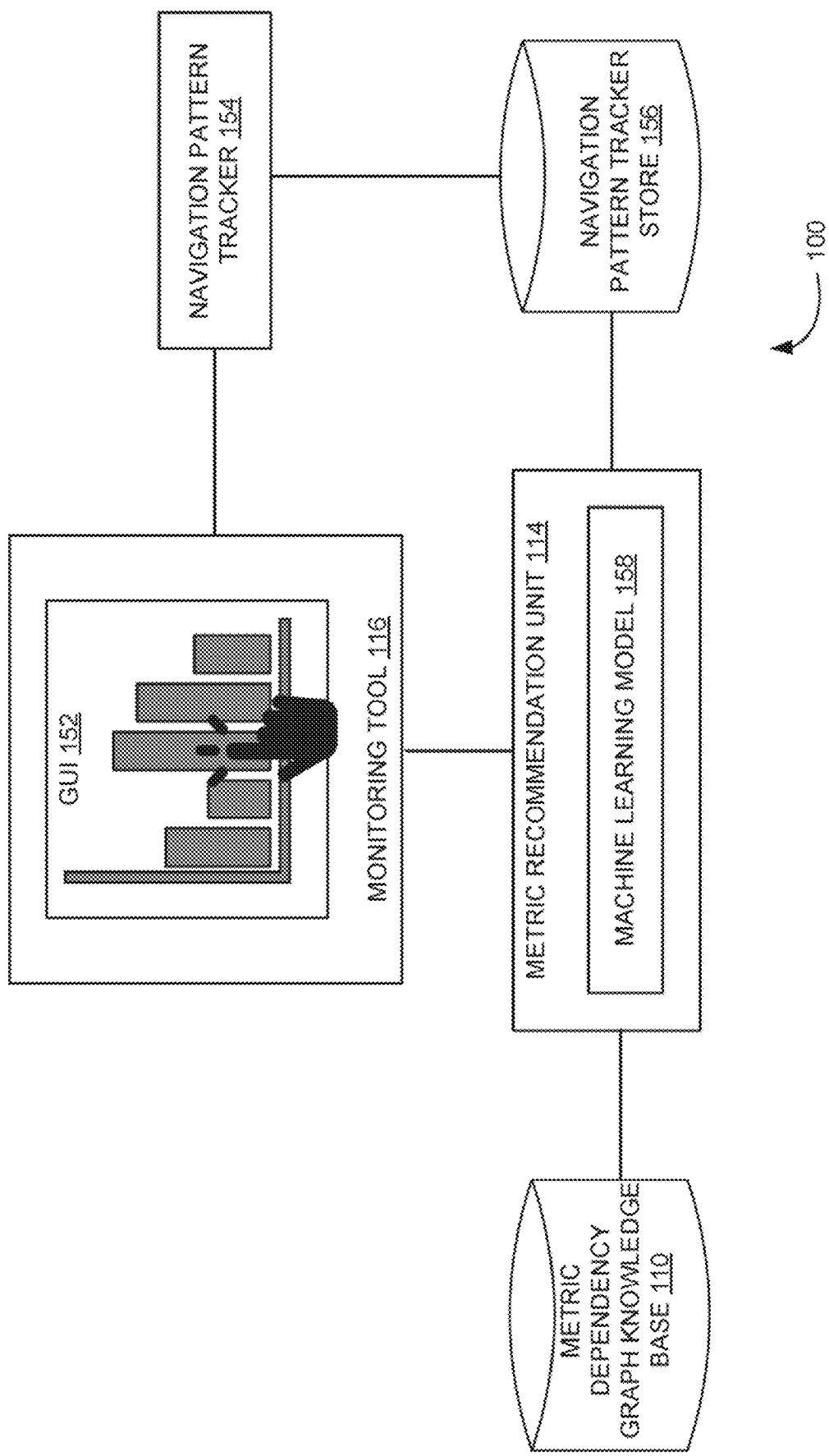
FIG. 1B is a block diagram of the example system of FIG. 1A, depicting additional features.

FIG. 1B is a block diagram of example system 100 of FIG. 1A, depicting additional features. Similarly named elements of FIG. 1B may be similar in function and/or structure to elements described in FIG. 1A. In an example, monitoring application 116 includes a GUI 152 to present metrics associated with the monitored computing-instance via a dashboard. Monitoring application 116 may present a time series data in a human readable form (e.g., in the form of charts). For example, the dashboard includes different charts, which can be purpose-built for a specific computing-instance to monitor the health of the computing-instance.

As shown in FIG. 1B, system 100 includes a navigation pattern tracker 154 and a navigation pattern tracker store 156. During design phase, navigation pattern tracker 154 may track a navigation pattern of users interacting with GUI 152. Further, navigation pattern tracker 154 may capture navigation pattern data when the users browse through the metrics in the GUI. For example, whenever the users of monitoring application 116 navigate through different charts in GUI 152, navigation pattern tracker 154 captures the navigation pattern data. The navigation pattern data may include details such as a metric name, a metric label/description, and the like. Further, navigation pattern tracker store 156 may store the captured navigation pattern data.

Further, as shown in FIG. 1B, metric recommendation unit 114 includes a machine-learning model 158. Furthermore, machine-learning model 158 may be built or trained with the navigation pattern data (e.g., which was stored in navigation pattern tracker store 156) and the data structure (e.g., which was stored in metric dependency graph knowledge base 110). Upon building the machine-learning model 158, machine-learning model 158 may be used to determine related metrics in real-time as described in FIG. 1A.

Thus, examples described herein utilize both the data structure (e.g., human knowledge) and the navigation pattern data (e.g., machine knowledge) in suggesting the related metrics. Further, examples described herein facilitate generation of dashboards as well as upon occurrence of an event post creation of the dashboards. For example, alerts are the mechanism that are used to monitor the health of the computing-instance. Once the dashboards are generated, the alerts may be configured to define thresholds so that the alerts can alarm the users (e.g., site reliability engineers) when there is an anomaly.

FIG. 2 shows example GUI 152 of FIG. 1B, depicting related metrics of a user selected metric. As shown in FIG. 2, GUI 152 may display a bar chart 202 depicting details of a metric "CPU capacity demand". Further, when a user selects (e.g., shown as 204) a first metric, a first menu 206 may be displayed. Example first menu 206 includes different options such as "edit", "recommendations", and the like. Further, when the user selects "recommendations", a second menu 208 including related metrics associated with the first metric such as "CPU capacity provisioned", "CPU capacity usage", "CPU core utilization", and the like may be displayed. For example, the related metrics may go as deeper hierarchy as possible as shown below.

Metric A->Metric A1->Metric A11 . . . . ->Metric AN

Figure 3B:
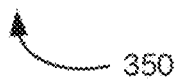
FIG. 3B shows an example data structure, depicting relationship between metrics.

For example, the hierarchy is represented as a directed acyclic graph (DAG). The DAG may include metric dependency levels indicating an order of dependency between the plurality of metrics. For example, the DAG may include a plurality of nodes (e.g., A1, A11, A12, A111, A112, A121, and the like) each representing a metric of the plurality of metrics and a set of edges connecting the plurality of nodes representing dependency relationships between the plurality of metrics. An example data structure including metrics and relationships is depicted in FIGS. 3A and 3B. Thus, examples described herein provide related metrics associated a metric that is being currently viewed or selected by the user.

FIG. 3A depicts an example data structure 300 in a JSON format. In an example, relationship between the metrics is dependent on business use cases. Further, capturing the relationship of the metrics from a particular computing-instance through a relationship JSON can enhance charts in the GUI to provide recommendations. As shown in FIG. 3A, data structure 300 may include details such as "name" (e.g., human readable name/label of the metric), "description" (e.g., a short description of the metric), "metric" (e.g., a unique metric key that is published to a monitoring application), "parents" (e.g., an array of parent metric key to which this metric is related) associated with different metrics. For example, data structure 300 includes details of metrics "CPU capacity demand" 302, "CPU capacity provisioned" 304, "CPU capacity usage" 306, and "CPU core utilization" 308. In the example shown in FIG. 3A, CPU capacity provisioned 304 and CPU core utilization 308 are dependent on CPU capacity demand 302, and CPU capacity usage 306 is dependent on CPU capacity provisioned 304.

FIG. 3B shows an example data structure 350, depicting relationship between metrics. In an example, data structure 300 (e.g., JSON structure) of FIG. 3A is analyzed and a graph connecting the metrics to each other is built. For example, when a given metric does not include a parent field, then such graph may turn into a tree or in other terms a connected acyclic graph. Further, multiple graph nodes may be built together to form a forest of graph nodes. Based on a parent field of FIG. 3A, the relationship may be built to arrive at a graph structure.

As shown in FIG. 3B, relationship may be built in a format including "name of the metric" 352, "brief description of the metric" 354, "metric named used to identify related metric" 356, and "a list of related metrics" 358. Further, the relationship between the metrics may be fed as an information to a metric recommendation unit (e.g., metric recommendation unit 114 of FIG. 1A). In an example, for a user selected metric, metric recommendation unit provides immediate child metrics (i.e., related metrics) that can be useful to look at to monitor a health of a computing-instance. The hierarchy of relation may continue till there is a leaf node metric which is not related to any node.

Figure 4:
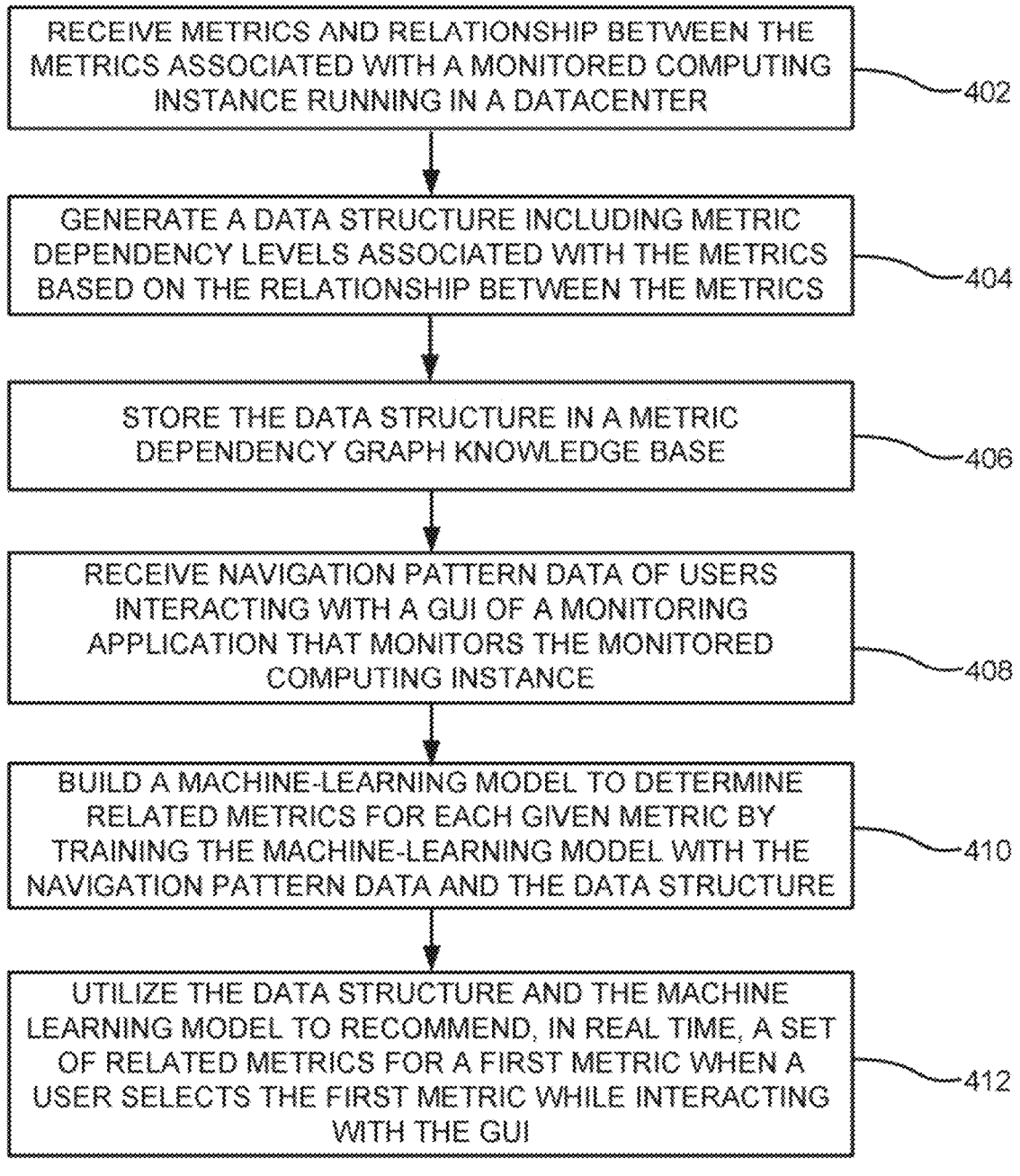
FIG. 4 is a flow diagram, illustrating an example method for building a machine-learning model to determine related metrics for a metric.

FIG. 4 is a flow diagram 400, illustrating an example method for building a machine-learning model to determine related metrics for a metric. The processes depicted in FIG. 4 represents generalized illustrations, and other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but the flow charts illustrate functional information to design/fabricate circuits, generate machine-readable instructions, or use a combination of hardware and machine-readable instructions to perform the illustrated processes.

At 402, metrics and relationship between the metrics associated with a monitored computing instance running in a data center may be received. In an example, receiving the metrics includes receiving time series data associated with the metrics.

At 404, a data structure including metric dependency levels associated with the metrics may be generated based on the relationship between the metrics. In an example, generating the data structure includes generating the data structure in a format selected from a group consisting of JavaScript object notation (JSON), extensible markup language (XML), a binary file, a database file, YAML ain't markup language (YAML), and/or a proprietary encoding scheme. At 406, the data structure may be stored in a metric dependency graph knowledge base.

At 408, navigation pattern data of users interacting with a GUI of a monitoring application that monitors the monitored computing instance may be received. the navigation pattern data is captured when the users browse through the metrics in the GUI. In an example, the navigation pattern data includes a plurality of screenshots captured during a sequence of user interaction with various metrics of the GUI over a period.

At 410, a machine-learning model (e.g., a supervised machine learning model) may be built to determine related metrics for each given metric by training the machine-learning model with the navigation pattern data and the data structure. In an example, building the machine-learning model includes:

training a set of machine learning models to predict related metrics for each given metric using a train dataset of the navigation pattern data, validating the trained machine learning models to tune an accuracy of the trained machine learning models based on a validation dataset of the navigation pattern data, testing the trained set of machine learning models with a test dataset of the navigation pattern data, and determining the machine learning model having a maximum accuracy from the set of tested machine learning models to predict, in real-time, the set of related metrics for the first metric.

At 412, the data structure and the machine learning model may be utilized to recommend, in real time, a set of related metrics for a first metric when a user selects the first metric while interacting with the GUI. Further, the user may be enabled to navigate through the set of related metrics to monitor the health of the monitored computing instance.

Figure 5:
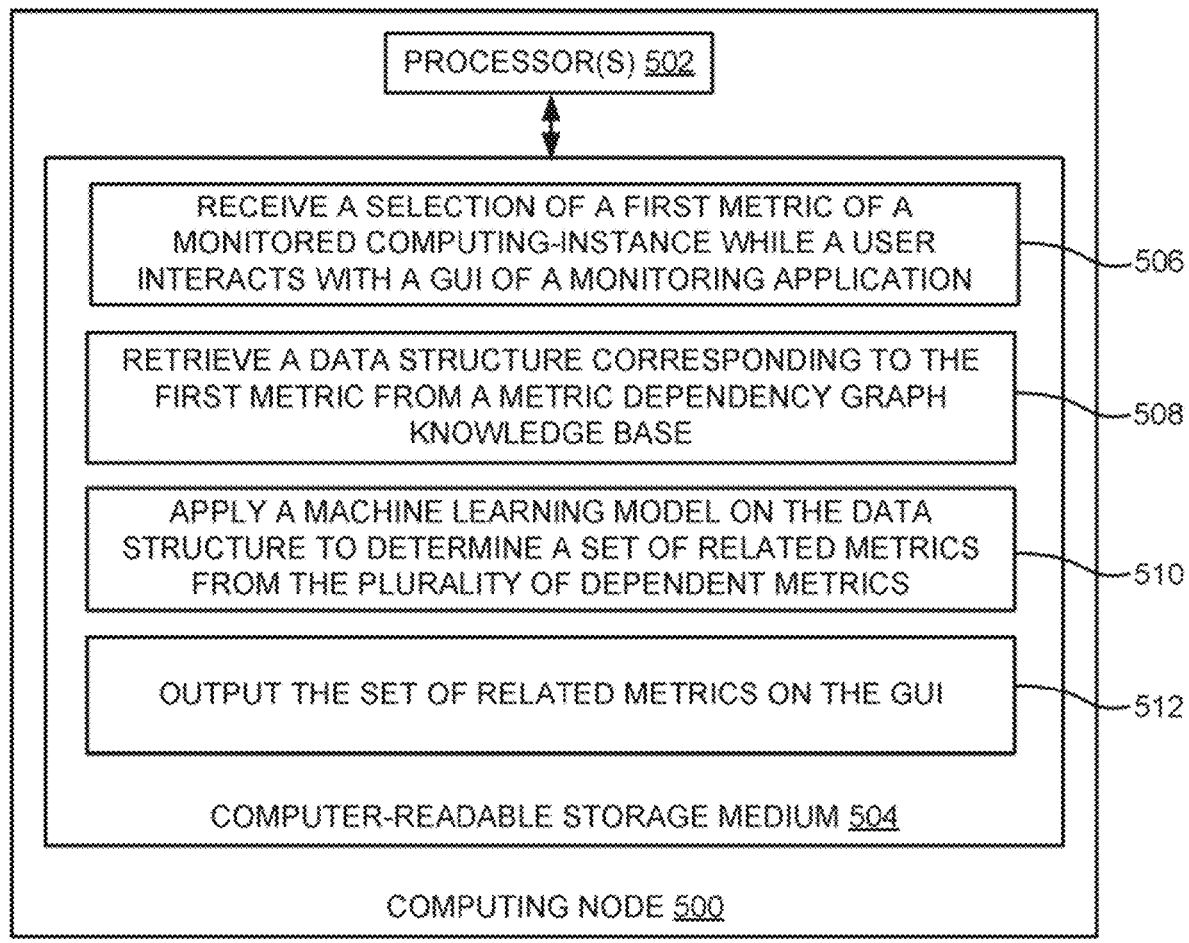
FIG. 5 is a block diagram of an example computing node including non-transitory computer-readable storage medium storing instructions to determine a set of related metrics of a metric to monitor a health of a computing-instance.

FIG. 5 is a block diagram of an example computing node 500 including non-transitory computer-readable storage medium 504 storing instructions to determine a set of related metrics of a metric to monitor a health of a computing-instance. Computing node 500 may include a processor 502 and computer-readable storage medium 504 communicatively coupled through a system bus. Processor 502 may be any type of central processing unit (CPU), microprocessor, or processing logic that interprets and executes machine-readable instructions stored in computer-readable storage medium 504. Computer-readable storage medium 504 may be a random-access memory (RAM) or another type of dynamic storage device that may store information and machine-readable instructions that may be executed by processor 502. For example, computer-readable storage medium 504 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, computer-readable storage medium 504 may be a non-transitory machine-readable medium. In an example, computer-readable storage medium 504 may be remote but accessible to computing node 500.

Computer-readable storage medium 504 may store instructions 506, 508, 510, and 512. Instructions 506 may be executed by processor 502 to receive a selection of a first metric of a monitored computing-instance while a user interacts with a graphical user interface (GUI) of a monitoring application.

Instructions 508 may be executed by processor 502 to retrieve a data structure corresponding to the first metric from a metric dependency graph knowledge base. In an example, the data structure includes the first metric and a plurality of dependent metrics associated with the first metric. For example, the data structure is formatted in accordance with one or more of JavaScript object notation (JSON), extensible markup language (XML), a binary file, a database file, YAML ain't markup language (YAML), and/or a proprietary encoding scheme.

Instructions 510 may be executed by processor 502 to apply a machine learning model on the data structure to determine a set of related metrics from the plurality of dependent metrics. In an example, the machine learning model is trained to determine the set of related metrics for the first metrics based on navigation pattern data of users interacting with the GUI. The navigation pattern data may include time series data captured while the user navigates through various charts in the GUI associated with the monitoring application. Further, a plurality of metrics may be displayed in different types of charts.

In an example, instructions 510 to apply the machine learning model on the data structure to determine the set related metrics related to the first metric include instructions to filter the plurality of dependent metrics by applying the machine learning model to the selected first metric.

Instructions 512 may be executed by processor 502 to output the set of related metrics on the GUI. In an example, the set of related metrics related to the first metric are outputted on the GUI in response to detecting an event that occurs in the monitored computing-instance of a data center.

Computer-readable storage medium 504 may further store instructions to be executed by processor 502 to create a dashboard including at least one chart on the GUI. In an example, the at least one chart represents the set of related metrics to monitor a health of the monitored computing-instance.

Further, computer-readable storage medium 504 may store instructions to be executed by processor 502 to enable the user to navigate through the set of related metrics to identify a root cause of an issue associated with the monitored computing-instance.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A computing node comprising:
  a metric dependency graph knowledge base to store a data structure representing a relationship between a plurality of metrics;
  a processor; and
  a memory comprising a metric recommendation unit to:
    determine a first metric of a monitored computing-instance while a user interacts with a graphical user interface (GUI) of a monitoring application;
    retrieve the data structure corresponding to the first metric from the metric dependency graph knowledge base, the data structure comprising the first metric and a plurality of dependent metrics associated with the first metric;
    apply a machine learning model on the data structure to determine a second metric from the plurality of dependent metrics, wherein the machine learning model is trained to determine the second metric related to the first metric based on navigation pattern data of users interacting with the GUI, the machine learning model being trained with the navigation pattern data and the data structure, the data structure and the machine learning model being used to recommend, a set of related metrics for a first metric when a user selects the first metric while interacting with the GUI; and
    output the second metric related to the first metric on the GUI.

2. The computing node of claim 1, wherein the metric recommendation unit is to output the second metric by generating a dashboard including a chart on the GUI, the chart representing the second metric.

3. The computing node of claim 1, wherein the metric recommendation unit is to enable the user to navigate through the second metric to identify a root cause of an issue associated with the monitored computing-instance.

4. The computing node of claim 1, wherein the metric recommendation unit is to output the second metric related to the first metric on the GUI in response to detecting an event that occurs in the monitored computing-instance of a data center.

5. The computing node of claim 1, wherein the data structure is formatted in accordance with one or more of JavaScript object notation (JSON), extensible markup language (XML), a binary file, a database file, YAML ain't markup language (YAML), and/or a proprietary encoding scheme.

6. The computing node of claim 1, wherein the navigation pattern data comprises time series data captured while the users navigate through the plurality of metrics in the GUI associated with the monitoring application.

7. The computing node of claim 1, wherein the metric recommendation unit is to:
apply the machine learning model on the data structure to determine a third metric related to the second metric from the plurality of dependent metrics in response to a user selection of the second metric on the GUI; and
output the third metric related to the second metric on the GUI.

8. A non-transitory computer-readable storage medium comprising instructions that, when executed by a processor of a computing node, cause the processor to:
receive a selection of a first metric of a monitored computing-instance while a user interacts with a graphical user interface (GUI) of a monitoring application;
retrieve a data structure corresponding to the first metric from a metric dependency graph knowledge base, the data structure comprising the first metric and a plurality of dependent metrics associated with the first metric;
apply a machine learning model on the data structure to determine a set of related metrics from the plurality of dependent metrics, wherein the machine learning model is trained to determine the set of related metrics for the first metrics based on navigation pattern data of users interacting with the GUI, the machine learning model being trained with the navigation pattern data and the data structure, the data structure and the machine learning model being used to recommend, a set of related metrics for a first metric when a user selects the first metric; and
output the set of related metrics on the GUI.

9. The non-transitory computer-readable storage medium of claim 8, further comprising instructions to:
create a dashboard including at least one chart on the GUI, the at least one chart representing the set of related metrics to monitor a health of the monitored computing-instance.

10. The non-transitory computer-readable storage medium of claim 8, further comprising instructions to:
enable the user to navigate through the set of related metrics to identify a root cause of an issue associated with the monitored computing-instance.

11. The non-transitory computer-readable storage medium of claim 8, wherein the set of related metrics related to the first metric are outputted on the GUI in response to detecting an event that occurs in the monitored computing-instance of a data center.

12. The non-transitory computer-readable storage medium of claim 8, wherein the data structure is formatted in accordance with one or more of JavaScript object notation (JSON), extensible markup language (XML), a binary file, a database file, YAML ain't markup language (YAML), and/or a proprietary encoding scheme.

13. The non-transitory computer-readable storage medium of claim 8, wherein the navigation pattern data comprises time series data captured while the user navigates through various charts in the GUI associated with the monitoring application, and wherein a plurality of metrics is displayed in different types of charts.

14. The non-transitory computer-readable storage medium of claim 8, wherein instructions to apply the machine learning model on the data structure to determine the set related metrics related to the first metric comprise instructions to:
filter the plurality of dependent metrics by applying the machine learning model to the selected first metric.

15. A computer-implemented method comprising:
receiving metrics and relationship between the metrics associated with a monitored computing instance running in a data center;
generating a data structure including metric dependency levels associated with the metrics based on the relationship between the metrics;
storing the data structure in a metric dependency graph knowledge base;
receiving navigation pattern data of users interacting with a graphical user interface (GUI) of a monitoring application that monitors the monitored computing instance, wherein the navigation pattern data is captured when the users browse through the metrics in the GUI;
building a machine-learning model to determine related metrics for each given metric by training the machine-learning model with the navigation pattern data and the data structure; and
utilizing the data structure and the machine learning model to recommend, in real time, a set of related metrics for a first metric when a user selects the first metric while interacting with the GUI.

16. The computer-implemented method of claim 15, wherein the navigation pattern data comprises a plurality of screenshots captured during a sequence of user interaction with various metrics of the GUI over a period.

17. The computer-implemented method of claim 15, wherein building the machine-learning model comprises:
training a set of machine learning models to predict related metrics for each given metric using a train dataset of the navigation pattern data;
validating the trained machine learning models to tune an accuracy of the trained machine learning models based on a validation dataset of the navigation pattern data;
testing the trained set of machine learning models with a test dataset of the navigation pattern data; and
determining the machine learning model having a maximum accuracy from the set of tested machine learning models to predict, in real-time, the set of related metrics for the first metric.

18. The computer-implemented method of claim 15, wherein generating the data structure comprises:
generating the data structure in a format selected from a group consisting of JavaScript object notation (JSON), extensible markup language (XML), a binary file, a database file, YAML ain't markup language (YAML), and/or a proprietary encoding scheme.

19. The computer-implemented method of claim 15, further comprising:

enabling the user to navigate through the set of related metrics to monitor the health of the monitored computing instance.

20. The computer-implemented method of claim 15, wherein receiving the metrics comprises receiving time series data associated with the metrics.

* * * * *